Jan. 26, 1971  W. FAHRNI  3,557,514
INTERCONNECTED SECTIONS AND FRAMES MADE THEREFROM
Filed Oct. 23, 1968  2 Sheets-Sheet 1

Jan. 26, 1971  W. FAHRNI  3,557,514
INTERCONNECTED SECTIONS AND FRAMES MADE THEREFROM
Filed Oct. 23, 1968  2 Sheets-Sheet 2

United States Patent Office 3,557,514
Patented Jan. 26, 1971

3,557,514
INTERCONNECTED SECTIONS AND FRAMES MADE THEREFROM
Walter Fahrni, Lyss, Bern, Switzerland, assignor to Swiss Aluminium Ltd., Chippis, Valais, Switzerland, a corporation of Switzerland
Filed Oct. 23, 1968, Ser. No. 769,814
Claims priority, application Switzerland, Oct. 24, 1967, 14,857/67
Int. Cl. E06b *1/18;* E04b *1/74*
U.S. Cl. 52—730            12 Claims

ABSTRACT OF THE DISCLOSURE

A combination of parts for erection into a frame includes inner and outer metal sections and at least one connecting element secured to the sections by local deformation of the element.

---

In modern external-wall construction, frame structures made of metal sections are employed with increasing frequency. There has therefore arisen a need to provide insulation in order to check the flow of heat through the metal sections.

Composite frames are known in which an outer and an inner metal section are interconnected by at least one heat-insulating connecting element. Known sections of this kind, however, have various drawbacks. The heat-insulating connecting elements consisting, for example, of plastics material or wood are cemented or flanged to the metal sections and this results in relatively complicated manufacturing methods. It is also uncertain, and has not yet been sufficiently demonstrated, that cemented joints last well enough.

In accordance with the present invention, a combination of parts for erection into a composite wall frame includes inner and outer metal sections and at least one thermally insulating connecting element which is arranged to interconnect the inner and outer sections and to be secured to the sections by local deformation of the element.

In this way, joining of the metal sections and the connecting elements by flanging or cementing is avoided together with the attendant disadvantages.

Preferably each connecting element is provided with two profiled portions one being arranged to engage in use a complementary profiled portion of the inner section and the other being arranged to engage in use a complementary portion of the outer section, and with at least one opening between the two profiled portions for receiving spreading means to deform the element locally. The local deformation of the connecting elements serves solely to secure them against displacement along the metal sections and does not impair the accurate spacing between the metal sections, because the spacing is determined by undeformed portions of the connecting elements.

The invention also includes a composite section erected from the combination of parts.

In addition, the invention includes a connecting element for carrying the above-described method into effect, the element comprising at least two profiled portions which are arranged to engage with complementary portions of inner and outer metal sections, and between which there is an opening to receive a spreading means for locally deforming the element and securing it to the sections.

One example of a window frame with a sash frame each constructed in accordance with the invention, and two modifications, are illustrated in the accompanying drawings, in which.

Figure 1:
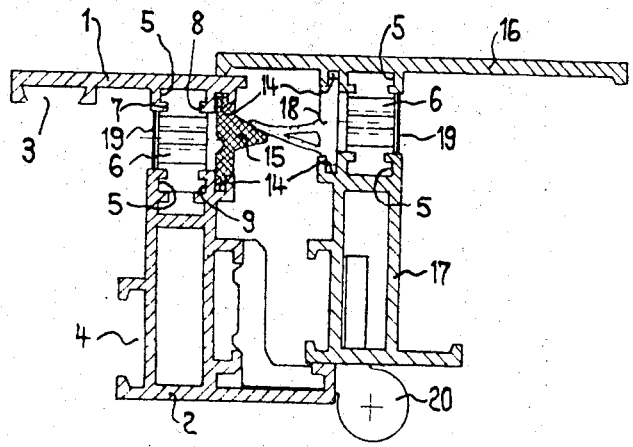
FIG. 1 is a horizontal sectional view of cooperating composite metal frames in accordance with an embodiment of the instant invention.

FIG. 1 is a cross-section, for example through a window frame and the associated sash frame, both of which are composite frames. The window frame, which is shown on the left, consists of a flat outer metal frame section 1 and an inner metal frame section 2. These sections are preferably made of aluminum and may be anodized. The sections 1 and 2 have undercut grooves 3 and 4 which are used for attaching parts of the window that are not shown. Both sections moreover have an undercut groove 5 and are interconnected by means of connecting elements 6 of synthetic plastic material, preferably nylon, inserted in the grooves 5.

Figure 3:
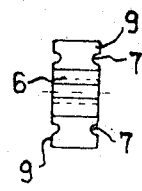
FIG. 3 is an end elevational view of a connecting element.
Figure 2:
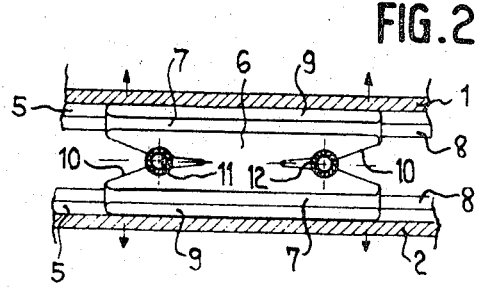
FIG. 2 is a fragmentary sectional view of a connecting element with the two members interconnected by it.

These connecting elements, which are shown separately in FIGS. 2 and 3, are of parallelepipedal form as a whole. They have two pairs of longitudinal grooves 7 in which inward projections 8 defining the undercut grooves 5 in the sections 1 and 2 can engage virtually without any play. Head portions 9 formed outside the grooves 7 on the connecting elements 6 likewise engage virtually without any play in the undercut grooves 5, so that reliable mutual coupling of the connecting elements and the sections 1 and 2 is effected. The component parts are so dimensioned that the connecting elements 6, when in their original undeformed state, can easily be pushed into the undercut grooves 5 and be slid into desired positions along the groove. The connecting elements 6, several of which are fitted along the sections 1 and 2 at any desired intervals, have at their opposite ends inwardly tapering notches 10, which are provided with cylindrical surfaces in a widened holding pocket 11. Suitable spreading means, for example the spreading pins 12 shown in FIG. 2, can be driven into these widened holding pockets 11 and the legs of the connecting elements 6 which are formed on both sides of the notches 10 can be spread outwardly by them to grip the projections 8. In this way, the connecting elements 6 are secured against longitudinal displacement. The exact spacing between the sections 1 and 2 is determined by the undeformed middle portions of the connecting elements 6, and is unaffected by the elastic deformation of the limbs enclosing the notches 10.

Adjacent the grooves 5, the sections 1 and 2 are each provided with a retaining groove 14 in which the edges of a sealing strip 15 of rubber like material are inserted.

The sash frame is constructed similarly to the window frame, namely from an outer metal section 16 and an inner metal section 17. These metal sections are also each provided with a groove 5 and connecting elements 6 are pushed into these grooves and anchored and spread or expanded in them in the manner described. Retaining grooves 14 for receiving a sealing strip 18 are also provided adjacent to the grooves 5. Moreover, the joints between the outer and inner metal sections 1 and 2 and 16 and 17, respectively, may be sealed by applying a suitable synthetic plastic sheet or film 19 at the side of the connecting elements 6. The reference numeral 20 in FIG. 1 designates the window hinge screwed on to the sections 2 and 17.

As is already apparent from the foregoing description, the connecting elements 6 permit very simple connection between two metal sections of a composite frame. The securing of the connecting elements 6 to the metal sections so as to prevent longitudinal displacement and, consequently, the securing of two metal sections of a composite frame against relative displacement in their longitudinal direction is effected exclusively by the purely mechanical spreading or expansion of the connecting elements, namely without either cementing or flanging. The transverse bracing of the metal sections of the composite frame is also effected exclusively by the interengagement of the profiled portions provided for this purpose on the metal sections and the connecting elements 6. In this way, the production of the composite frames is considerably simplified, as the necessary connecting elements 6 are pushed-in in succession against the sections, which are thereby coupled temporarily, and the individual connecting elements are then secured at the desired points by driving in the spreading pins 12.

If it is necessary to weld the composite frame together to form the frame members, the connecting elements 6 may be inserted between the corresponding metal sections before the welding, but can be pushed together so that they are sufficiently distant from the welding point during the welding work so that they will not be heated excessively. After the welding has been completed, the connecting elements 6 can then be moved to the desired positions and then be spread.

Figure 5:
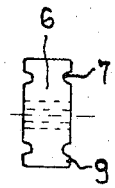
FIGS. 4 and 5 show a modified connecting element in side and end elevational view, respectively.
Figure 4:
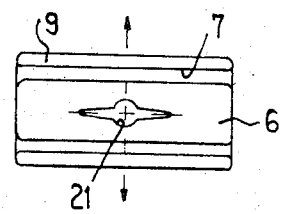

Instead of the connecting elements shown in FIGS. 2 and 3, it is also possible to employ those illustrated in FIGS. 4 and 5, which differ in that one central elongated slot-like opening 21 is provided instead of two notches 10 at the opposite ends of the connecting element. A spreading means can likewise be driven into this opening and the central portion of the connecting element can thereby be braced against the sections to be connected.

Figure 6:
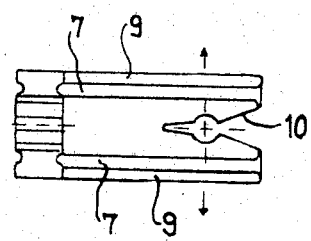
FIGS. 6 and 7 show a second modification of the connecting element in end and side elevational view, respectively.
Figure 7:
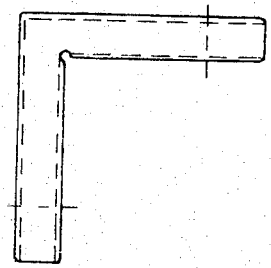

Finally, FIGS. 6 and 7 show an angular connecting element in which corresponding portions are again referenced in the same way as in the other figures. These connecting elements can be used to reinforce corner joints of the composite frame.

In place of the separate connecting elements heretofore described and to be arranged at certain intervals, it is also possible in certain circumstances to employ similarly profiled connecting elements in strip form, the length of which correpsonds approximately to that of the metal sections to be connected and which may be deformed at certain points along their length. These connecting strips, for example, may have the same cross-section as the connecting elements according to FIGS. 2 to 5 and they may be provided at regular intervals with openings 21 in accordance with FIG. 4 into which spreading pins can be driven.

Lengths of such a connecting strip may be prepared to be cut to size during fitting. The use of individual connecting elements according to FIGS. 2 to 5, however, has the advantage that they can be injection-molded from nylon, which has a high insulating capacity, stability and dimensional accuracy.

The construction according to the invention has the advantage of being easily fabricated by the metal constructor. He has the possibility of combining, according to requirements, different forms of inner and outer sections, for example, outer sections with retaining flanges for the glass pane on one side (as shown in FIG. 1) or with such flanges on both sides as used for middle posts, with inner sections of more or less thick web which simplifies the storing of stock. He can also treat the surface of the sections, especially in the case of aluminum, by anodizing them in fabrication lengths or after having cut and worded them in lengths ready for assembling before inserting the connecting elements. Finally, the individual sections according to the invention are particularly suitable for mechanical assemblying to frames by means of metallic corner pieces.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A combination of parts for erection into a composite frame, the combination including inner and outer metal sections and a plurality of connecting means arranged to interconnect the inner and outer section, each connecting means consisting of a single thermally insulating element engaging said metal sections including at least one deformable portion and being secured to the sections by local deformation of said portion of the element.

2. A combination according to claim 1, in which each connecting element is provided with two profiled portions one being arranged to engage in use a complementary profiled portion of the inner section and the other being arranged to engage in use a complementary profiled portion of the outer section, and with at least one opening between the two profiled portions for receiving spreading means to deform the element locally.

3. A combination according to claim 2, including a spreading pin for insertion into each opening.

4. A combination according to claim 2, in which each element has a central opening which is elongated in the longitudinal direction for receiving the spreading means.

5. A combination according to claim 2, in which the connecting element is in the form of a strip with a number of longitudinally spaced openings so that it can be deformed transversely at a number of points along its length.

6. A combination according to claim 2, in which the element is such that in use the spacing between the metal sections is determined by substantially undeformed portions of the connecting element or elements.

7. A combination according to claim 2, in which the profiled portions of the sections are undercut defining grooves in which the profiled portions of the connecting element are wedged upon local deformation.

8. A combination according to claim 7, in which the connecting element is elongated and its profiled portions extend along opposite parallel edges so that it can be slid into the undercut grooves in the two sections to hold these grooves substantially parallel to one another, the opening in the element extending transversely of the element.

9. A composite metal frame erected from a combination of parts according to claim 1, with the connecting means interconnecting the inner and outer metal sections and secured to the sections by local deformation of the element.

10. A frame according to claim 9, in which the metal sections are sealed together by means of a resilient strip located in retaining grooves in the sections.

11. A connecting element for use in erecting a composite frame in accordance with claim 9, the element comprising at least two profiled portions which are arranged to engage with complementary portions of the inner and outer metal sections, and between which there is an opening to receive a spreading means for locally deforming the element and securing it to the sections.

12. A combination of parts for erection into a composite frame, the combination including inner and outer metal sections and at least one thermally insulating connecting element is arranged to interconnect the inner and outer sections and secured to the sections by local deformation of the element, in which each connecting element is provided with two profiled portions, one being arranged to engage in use a completary profiled portion of the inner section and the other being arranged to engage in use a complementary profiled portion of the outer section, and with at least one opening between the two profiled portions for receiving spreading means to deform the element locally, in which each element has at each end an inwardly tapering notch opening into a widened portion which forms an opening to receive the spreading means.

(References on following page)

References Cited

UNITED STATES PATENTS

| | | | |
|---|---|---|---|
| 1,726,362 | 8/1929 | Orsenigo | 287—20.92E |
| 2,870,881 | 1/1959 | Rogge | 287—20.92E |
| 3,343,317 | 9/1967 | Cripe | 52—403X |
| 3,420,026 | 1/1969 | Nolan | 52—403 |

FOREIGN PATENTS

| | | | |
|---|---|---|---|
| 768,499 | 2/1957 | Great Britain | 49—504 |
| 972,180 | 10/1964 | Great Britain | 52—730 |

PRICE C. FAW, Jr., Primary Examiner

U.S. Cl. X.R.

24—81; 49—504; 52—403; 287—20.92